Patent 3,068,103

3,068,103
METHOD OF PREPARING BREAD
Noel H. Kuhrt and Leonard J. Swicklik, Rochester, N.Y., assignors to Eastman Kodak Company, Rochester, N.Y., a corporation of New Jersey
No Drawing. Filed Feb. 11, 1960, Ser. No. 8,002
6 Claims. (Cl. 99—90)

This invention relates to a new bread-baking process.

One of the desirable properties of a commercial bread product is the property of delayed firming. Likewise, it is a desirable property of bread to have close, fine grain, namely, good texture.

It is an object of this invention to prepare bread by a novel process.

It is another object of this invention to provide a bread product having an extended shelf-life by a new baking process.

It is another object of this invention to prepare bread having good texture by a new method.

It is also an object of this invention to retard the firming of bread by adding to the dough batch prior to baking a minor proportionate amount of certain diglyceride materials.

These and other objects of the invention are accomplished by incorporating into a bread baking mix or dough batch prior to baking a minor proportionate amount of a diglyceride having one acyl radical derived from lactic acid and one acyl radical derived from a saturated fatty acid having 16 to 18 carbon atoms.

The higher acyl radical or moiety of the subject additives can be derived from palmitic acid and stearic acid, and preferably from the fatty acid moieties of hydrogenated fats and oils. The fatty acid moieties of many well-known fatty materials consist essentially of mixtures of palmitic acid and stearic acid, or fatty acids such as palmitoleic acid, oleic acid, linoleic acid and linolenic acid which can be converted by hydrogenation into palmitic acid as stearic acid. For example, the fatty acid moieties in hydrogenated lard are comprised of about 94% palmitic acid and stearic acid and can be used as the source of the higher acyl moiety in the subject diglyceride additives. Likewise, the fatty acid moieties of other hydrogenated fats and oils such as cottonseed oil, peanut oil, soybean oil, palm oil, olive oil, beef tallow and others can be used as the higher acyl portion of the subject diglyceride additives.

A particularly effective method for preparing the subject diglyceride additives is to first prepare a monoglyceride by reacting glycerol and a hydrogenated fat or oil, palmitic acid, stearic acid, or the like, in the presence of an esterification catalyst, and thereafter separating from the reaction mixture by distillation, a high purity monoglyceride. The preparation of purified and concentrated monoglycerides by thin film high vacuum distillation is described in U.S. Patents 2,634,234, 2,634,278 and 2,634,729, monoglycerides prepared by such methods being suitable for use in preparing the subject diglyceride additives. The prepared monoglyceride is thereafter reacted with about an equal molar proportion of lactic acid. Usually reaction temperatures from about 110° C. to 160° C. and reaction times from about 1 hour to 6 hours are employed in reacting the monoglyceride with lactic acid. Maximum amounts of the subject diglyceride additives can be obtained by correlating such time and temperature conditions. Relatively bitter or sour tasting free lactic acid and such lactic acid esters as monolactin, dilactin and trilactin usually present in the resulting reaction mixture can be readily removed by washing with water or by subjecting the reaction mixture to vacuum "stripping" as in a molecular still. Solvent crystallization can be employed to further concentrate the subject diglyceride additives.

The subject diglyceride additives can also be prepared by reacting under esterification conditions of usually about 200° C. to 300° C. glycerine, lactic acid and a suitable fatty triglyceride or higher fatty acid. The resulting reaction mixture can be worked-up by washing with water or by vacuum "stripping," or it can be subjected to thin film high vacuum distillation to separate out a concentrate of the diglyceride additive of the invention.

In preparing the present diglyceride additives as described above, substantial amounts of monoglycerides having the described higher acyl moieties are commonly found in admixture therewith. Such mixtures can be suitably employed in the present bread baking process. Likewise, a convenient method for incorporating the subject diglyceride additives into the baking mix prior to baking is to admix such additives with a portion of, or all of, the shortening utilized.

Only minor proportionate amounts of the bread additive of the invention need be added to the baking mix or dough batch for effective results, with concentrations of .1% to 3% being suitable and .1% to 1.5% be more generally utilized, the concentrations of additive being based on the weight of the baking mix.

The diglyceride additives of the invention impart to bread an extended shelf-life or period of retarded firmness. Diglycerides have been acknowledged in the art as not being effective bread additives for such purposes. For example, distearin has poor properties with respect to retarding firmness in bread. Similarly, we have found that the diglyceride, monoaceto monostearin, while being a useful additive for improving various properties in such baking products as cakes, does not have utility in bread formulations as a firmness retarder. Thus, it was unexpected when we found that the diglyceride additives of the invention, such as monolacto monostearin and monolacto monopalmitin, had particular utility for imparting to bread an extended shelf-life or period of retarded firmness. In addition, the subject diglyceride additives impart to bread a greater appearance of whiteness and an improved texture such as finer and closer grain than that obtained with such monoglycerides as monostearin and monopalmitin.

The term "bread" as used herein refers to the baked product and includes not only loaf bread, but also, rolls, buns and the like. Likewise, the invention includes various types of breads such as white bread, rye bread, whole wheat bread and other well-known types of bread. The bread can be prepared by any of the well-known methods, including the sponge and dough procedure, as well as by the straight dough method.

The term "baking mix" as used herein refers to the mixture of ingredients or recipe commonly employed in the preparation of bread, and may include such ingredients as flour, shortening, sugar, salt, powdered milk, water, yeast food, yeast, and the like.

The following examples illustrate the preparation of the diglyceride additives of the invention and their use in the baking of bread.

EXAMPLE 1

A 300 gram portion of molecularly distilled monoglyceride composition having the fatty acid radicals of hydrogenated lard and having a monoglyceride content of about 95% was reacted with a 140 gram portion of 85% lactic acid with stirring at 140° C. under nitrogen by five hours. The resulting reaction mixture was stripped of the more volatile materials such as lactic acid, monolactin, dilactin, and trilactin by subjecting the reaction mixture to thin film molecular distillation at a temperature of about 125° C. and at a pressure of about 15 microns of mercury. One part by weight of the remaining distilland was then dissolved in a solvent composed of 8 parts by weight of petroleum ether (B.P. 30–60° C.) and 1 part by weight of 95% ethanol, chilled to 3° C. and left over night. The resulting mixture was then filtered and the solvent evaporated from the filtrate to yield a concentrate of the diglyceride additive of the invention. The prepared concentrate was further concentrated by dissolving in benzene at a concentration of 1 part by weight of the concentrate for each 9 parts by weight of benzene. The resulting mixture was then filtered and the solvent evaporated from the filtrate to yield a diglyceride composition composed of about 8% by weight of monoglyceride having the acyl radicals of hydrogenated lard and about 92% by weight of diglycerides having one acyl radical derived from the lactic acid and one acyl radical derived from the hydrogenated lard. The diglycerides consisting essentially of a mixture of monolacto monopalmitin and monolacto monostearin.

EXAMPLE 2

The diglyceride composition prepared as described in Example 1 was tested as a firmness retarder in a typical "2% lard bread" formula, the bread formula having the following ingredients:

Sponge

| | Parts by weight |
|---|---|
| Flour | 65.0 |
| Water | 40.5 |
| Yeast | 1.75 |
| Yeast food | 0.5 |

Dough

| | |
|---|---|
| Flour | 35 |
| Water | 27 |
| Sugar | 6 |
| Salt | 2.25 |
| Powdered milk | 4 |
| Lard | 2 |
| Diglyceride composition | .25 |

The flour employed in both the sponge and the dough was short-patent, spring-wheat, white, bread flour. The sponge was mixed for 4.5 minutes and allowed to ferment 4.5 hours at 87° F. and at a relative humidity of 80%. To the resulting fermented sponge was added the dough ingredients. The sponge and the dough ingredients were admixed for 9.5 minutes, given a 30-minute "floor time," made up into loaves, and allowed to rise for 65 minutes at 98° F. and at a relative humidity of 95%. The raised dough batch was then baked at 450° F. for 20 minutes in loaves weighing about 450 grams. The resulting baked loaves of bread were allowed to cool at room temperature for one hour and thereafter wrapped and sealed in wax paper and stored at 72° F. For comparative purposes, the same amount of monoglyceride containing the acyl radicals of hydrogenated lard and monoaceto monoglyceride containing the acyl radicals of hydrogenated lard were substituted for the diglyceride composition additive of the invention in the above described bread. At intervals the various sample loaves of bread containing the different additives were tested for firmness or softness with a Baker Compressimeter. The Baker Compressimeter employed was of the type described in Cereal Laboratory Methods, 5th edition, 1947, compiled and published by the American Association of Cereal Chemists, pages 162–165. The bread baked with the diglyceride composition additive of the invention retained the softness characteristic of fresh bread for more than 48 hours longer than the bread baked with the aceto monoglyceride or with no additive. The bread baked with the diglyceride composition additive of the invention possessed an appearance of greater whiteness and finer grain than that possessed by the bread baked with the monoglyceride.

EXAMPLE 3

A 200 gram portion of the hydrogenated soybean oil was heated with stirring to about 170° C. in a 500 ml. 3-necked flask, and then a 0.4 gram portion of saturated aqueous sodium hydroxide and a 36 gram portion of 95% glycerol added thereto. The resulting mixture was heated for 30 minutes under nitrogen at about 180° C. The reaction mixture became clear, 36 grams of 85% lactic added thereto, the resulting mixture heated for 2 hours under nitrogen at about 180° C., and then 150 cc. of hot (about 90° C.) 3% aqueous sodium sulfate solution added with gentle stirring. Thereafter the aqueous layer was decanted and discarded. The reaction mixture was washed twice more with 150 cc. of hot 3% aqueous sodium sulfate, and the residual water removed under vacuum on a steam bath. The washed reaction product was then subjected to thin film molecular distillation and a fraction was collected in the temperature range of 110–180° C. at a pressure of about 15 microns of mercury. The resulting distillate containing about 50% by weight of monoglycerides having the acyl radicals of hydrogenated soybean oil and about 50% by weight of a diglyceride having one acyl radical derived from the lactic acid and one acyl radical derived from the hydrogenated soybean oil, when incorporated into bread at the level of .25 part by weight in the bread formulation described in Example 2 in lieu of the diglyceride composition additive and tested as described in Example 2, produces a bread having a period of softness characteristic of fresh bread that is more than 48 hours longer than bread without this additive as determined with a Baker Compressimeter described in Example 2 and fine, close grain.

EXAMPLE 4

A 260 gram portion of a higher fatty acid mixture (95% palmitic acid, 4% stearic acid and 1% myristic acid) and a 130 gram portion of 95% glycerol were reacted in the presence of 0.4 gram of strontium hydroxide with stirring under nitrogen at a temperature of about 250° C. for 1.5 hours. The resulting reaction mixture was then cooled to about room temperature, excess or unreacted glycerine drawn off and stripped on a thin film molecular still at a temperature of about 110° C. and at a pressure of about .2 mm. of mercury. The resulting distilland was reacted with an 87 gram portion of 85% lactic acid under nitrogen at 160° C. for 2 hours. The resulting reaction product was water-washed. The water-washed reaction product was then subjected to thin film molecular distillation and a distillate fraction collected in the temperature range of 115°–140° C. at a pressure of about 15 microns of mercury. The collected fraction was a white, waxy solid melting at 44°–46° C. and composed of approximately 63% by weight of diglycerides containing one acyl radical derived from the lactic acid and one acyl radical derived from the higher fatty acid mixture. When this prepared composition is substituted for the diglyceride composition additive in the bread formulation described in Example 2 at a level of .25 part by weight and tested as described in Example 2, a bread product results that has a period of softness characteristic of fresh bread that is more than 48 hours longer than bread baked without this additive as determined with a Baker Compressimeter as described in Example 2 and fine, close grain.

As pointed up by the above examples, the subject diglyceride additives have considerable utility in the bread baking art, particularly as agents to retard the firming of bread.

Although the invention has been described in considerable detail with reference to certain preferred embodiments thereof, it will be understood that variations and modifications can be effected within the spirit and scope of the invention as described hereinabove and as defined in the appended claims.

We claim:
1. In the baking of bread, the method which comprises incorporating into the baking mix prior to baking .1% to 3% by weight based on the baking mix of a diglyceride having one acyl radical derived from lactic acid and one acyl radical derived from a saturated fatty acid having 16 to 18 carbon atoms.
2. In the baking of bread, the method which comprises incorporating into the baking mix prior to baking .1% to 1.5% by weight based on the baking mix of monolactoyl monopalmitoyl glycerol.
3. In the baking of bread, the method which comprises incorporating into the baking mix prior to baking .1% to 1.5% by weight based on the baking mix of monolactoyl monostearoyl glyercol.
4. In the baking of bread, the method which comprises incorporating into the baking mix prior to baking .1% to 1.5% by weight based on the baking mix of a diglyceride having one acyl radical derived from lactic acid and one acyl radical derived from a hydrogenated triglyceride selected from the group consisting of hydrogenated fats and hydrogenated oils having acyl radicals consisting essentially of stearoyl radicals and palmitoyl radicals.
5. The method as described in claim 4 wherein the hydrogenated triglyceride is hydrogenated soybean oil.
6. The method as described in claim 4 wherein the hydrogenated triglyceride is hydrogenated lard.

References Cited in the file of this patent
UNITED STATES PATENTS

| | | |
|---|---|---|
| 2,690,971 | Iveson et al. | Oct. 5, 1954 |
| 2,744,825 | Thompson et al. | May 8, 1956 |
| 2,978,329 | Cochran et al. | Apr. 4, 1961 |